(No Model.)
W. M. FOWLER.
LIQUID DISPENSING APPARATUS.
No. 551,540. Patented Dec. 17, 1895.
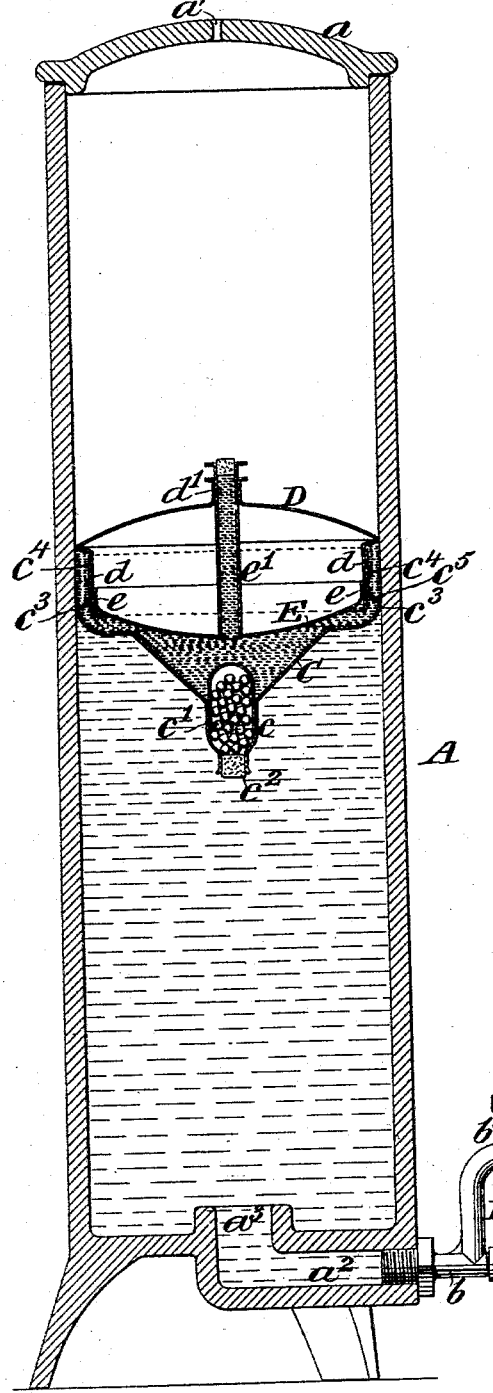
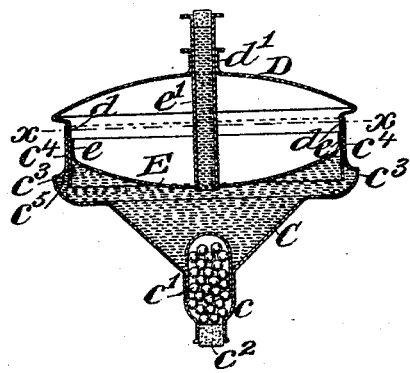
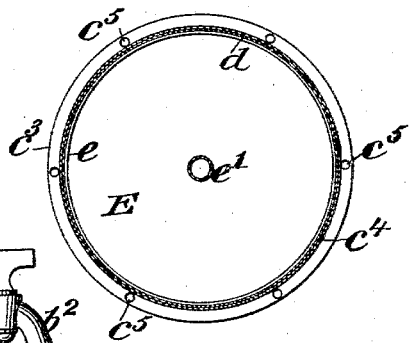
Witnesses:
C. F. Sundgren
George Barry
Inventor:
William M. Fowler
by attorneys
Brown & Seward

UNITED STATES PATENT OFFICE.

WILLIAM MILES FOWLER, OF STAMFORD, CONNECTICUT.

LIQUID-DISPENSING APPARATUS.

SPECIFICATION forming part of Letters Patent No. 551,540, dated December 17, 1895.

Application filed June 7, 1895. Serial No. 551,964. (No model.)

*To all whom it may concern:*

Be it known that I, WILLIAM MILES FOWLER, of Stamford, in the county of Fairfield and State of Connecticut, have invented a new and useful Improvement in Liquid-Dispensing Apparatus, of which the following is a specification.

My invention relates to an improvement in liquid-dispensing apparatus in which the liquid to be dispensed is held perfectly protected from air within the receptacle from which it is being drawn.

For the purpose of illustrating my invention I have chosen a cylindrical-shaped vessel, provided with a faucet at its bottom; but I do not wish to limit myself, in my present invention, to any specific form of vessel, as the means which I employ for protecting the liquid from the air is applicable in numerous forms and sizes.

In the accompanying drawings, Figure 1 shows a vertical section through the supply-tank and through the float therein, the parts of the float being adjusted in operative position. Fig. 2 is a vertical section of the float in detail, the parts being in the position which they assume before the float is adjusted to form a seal; and Fig. 3 is a horizontal section through the line $x \, x$ of Fig. 2, looking toward the bottom of the float.

My invention contemplates, in its broadest sense, the maintaining of a liquid seal in immediate proximity to the surface of the liquid within the tank from which it is being drawn during the lowering movement of the surface of said liquid.

In order to maintain the liquid seal to the best advantage, a float formed of some suitable solid material is employed, in connection with the liquid, for holding the latter in the proper position to more satisfactorily shut off the liquid, which is to be withdrawn from the tank, from the air.

The receptacle or tank from which the liquid is to be drawn is denoted by A. It is provided with a removable cover $a$, through which there is an air-vent $a'$ and at the bottom there is an outlet-channel $a^2$, the end $a^3$ of said channel within the receptacle extending a short distance above the bottom of the receptacle and the outer end of said channel or conduit having a faucet B screwed therein.

The faucet B has a straight portion $b$ at the end toward the vessel A and is provided with a removable cap $b'$ for the purpose of attaching thereto a hose or other suitable conducting-pipe for filling the tank A without disturbing the air-tight seal. From the straight portion $b$ a curved outlet portion $b^2$ extends, provided with a stop-cock $b^3$. The straight portion $b$ with its removable cap $b'$ also forms a convenient means for drawing off any sediment which may accumulate at the bottom of the tank A.

The float for holding and discharging the sealing liquid which, in the present instance, may be a mineral oil—such, for example, as what is known in the trade as "Eclipse White"—consists of a funnel-shaped lower section C having at its apex a pocket $c$ for the reception of shot $c'$ or other suitable weights to keep the float centered within the upper portion of the liquid within the tank A, the said pocket $c$ being provided with a stopper $c^2$ for tightly closing its mouth after the weight has been inserted within the pocket. The upper portion of the funnel-shaped section C bulges outwardly, as shown at $c^3$, to form a loose sliding fit within the tank A and then contracts in size, terminating in a rim $c^4$.

The upper section of the float is denoted by D and has a convex top which has a loose sliding fit within the tank A and a depending rim $d$, which fits snugly within the upwardly-extending rim $c^4$ of the lower section, forming a liquid-tight joint between the two. It is intended that the fit of the rim $d$ shall be so close within the rim $c^4$ as to hold the parts together by friction without need of any additional means of uniting them. The top of the section D is provided with a nozzle $d'$ centrally located. Within the hollow float, formed by the sections C and D, there is located a plunger E preferably having a concave bottom and an upwardly-extending rim $e$, which fits with a liquid-tight sliding joint within the depending rim $d$ of the section D. From the center of the bottom of the plunger E a tube $e'$ extends upwardly through the nozzle $d'$ and forms a communication with the space between the plunger E and the interior of the lower section C. The plunger E has a sufficiently spring frictional contact at its rim between the tube $e'$ and the nozzle $d'$ to hold it in the desired vertical adjustment, and provision is made for admitting sufficient air between the tube $e'$ and the interior of the nozzle $d'$ to permit the plunger to be depressed without producing a vacuum between it and the interior of the section D.

When the parts are assembled, as shown in Fig. 2, there will be an annular recess around the float between the bulge $c^3$ upon the section C and the extreme periphery of the top D of the upper section, and this recess communicates with the space between the plunger and the interior of the lower section C through holes $c^5$ in the upper wall of the bulging portion $e^3$.

The float having been charged with the sealing liquid, as shown in Fig. 2, and the upper end of the tube $e'$ of the plunger having been tightly closed, the float is adjusted upon the liquid in the tank A by first inserting it into the upper portion of the liquid until the surface of the liquid reaches approximately to the top of the plunger $c^3$, the weight $c'$ being regulated to hold the float at that depth and the plunger E is then pressed downwardly into the position shown in Fig. 1, ejecting the sealing liquid through the holes $c^5$ into the recess around the float until the said recess is filled with the sealing liquid. As the liquid in the tank A lowers by drawing it off at the faucet B, the float with the liquid seal will follow the surface of the liquid in the tank A downwardly until it is finally arrested by the contact of the float with the bottom of the tank. The tank A may be refilled by removing the cap $b'$ and forcing the liquid into the tank A, the float rising on the surface of the liquid toward the top of the tank. This seal has been found so absolutely perfect that claret wine, which is subject to become sour when exposed to the air for any considerable time, has been kept for several months without losing—so far as the tests have shown—either its sweetness or its aroma. By the use of this seal it becomes perfectly feasible to dispense wines or other beverages which heretofore it has been necessary to sell by the bottle or quantity and to be used at once or be rendered useless in such quantities as may be desired from time to time without any waste.

What I claim is—

1. A movable seal, comprising a float, a sealing liquid carried by the float and means for ejecting the liquid from the interior to the exterior of the float, substantially as set forth.

2. A movable seal, comprising a hollow float provided with a chamber for the reception of a sealing liquid, said chamber having openings therethrough to the exterior of the float and a plunger within the float for forcing the sealing liquid out of the float, substantially as set forth.

3. The movable seal, comprising a float having a weight for balancing it, a chamber for the reception of a sealing liquid, said chamber having openings to the exterior of the float and means for exerting pressure upon the sealing liquid within the float to eject it, substantially as set forth.

4. The movable seal, comprising a lower tapered section having a pocket at its apex for the reception of a weight, an upper section fitted liquid tight to the lower section and forming an annular recess around the float and a plunger having a sliding movement within the float and a tubular connection through the top of the float, substantially as set forth.

5. The combination with a tank or receptacle and a movable seal fitted to the interior of the receptacle, of a faucet at the lower end of the receptacle, said faucet being provided with a removable cap intermediate of the tank and a stop cock for gaining access to the interior of the tank other than through the stop cock, substantially as set forth.

WILLIAM MILES FOWLER.

Witnesses:
 FREDK. HAYNES,
 IRENE B. DECKER.